(12) United States Patent
Yu et al.

(10) Patent No.: US 11,758,147 B2
(45) Date of Patent: Sep. 12, 2023

(54) METHODS AND APPARATUS OF BITSTREAM VERIFYING AND DECODING

(71) Applicant: Zhejiang University, Hangzhou (CN)

(72) Inventors: Hualong Yu, Hangzhou (CN); Lu Yu, Hangzhou (CN); Xiaoding Gao, Hangzhou (CN); Qichao Yuan, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/427,454

(22) PCT Filed: Jan. 15, 2020

(86) PCT No.: PCT/CN2020/072222
§ 371 (c)(1),
(2) Date: Jul. 30, 2021

(87) PCT Pub. No.: WO2020/156175
PCT Pub. Date: Aug. 6, 2020

(65) Prior Publication Data
US 2022/0132140 A1 Apr. 28, 2022

(30) Foreign Application Priority Data

Feb. 1, 2019 (CN) .......................... 201910107763.9
May 7, 2019 (CN) .......................... 201910375478.5

(51) Int. Cl.
*H04N 19/152* (2014.01)
*H04N 19/172* (2014.01)
(Continued)

(52) U.S. Cl.
CPC ......... *H04N 19/152* (2014.11); *H04N 19/172* (2014.11); *H04N 19/174* (2014.11); *H04N 19/44* (2014.11)

(58) Field of Classification Search
CPC .. H04N 19/152; H04N 19/172; H04N 19/174; H04N 19/44
See application file for complete search history.

(56) References Cited

U.S. PATENT DOCUMENTS

| 6,658,199 B1 * | 12/2003 | Hallberg .............. H04N 9/8042 386/349 |
| 2004/0005007 A1 | 1/2004 | Viscito et al. |

(Continued)

FOREIGN PATENT DOCUMENTS

| CN | 1251004 A | 4/2000 |
| CN | 101317459 A | 12/2008 |

(Continued)

OTHER PUBLICATIONS

Zuo, Xuguang, "Research on Multi-Layer Based Video Coding," China Doctoral Dissertations Full-Text Database, No. 11, Nov. 15, 2017, pp. 1-146.

*Primary Examiner* — Kyle M Lotfi
(74) *Attorney, Agent, or Firm* — Muncy, Geissler, Olds & Lowe, P.C.

(57) ABSTRACT

A method of bitstream verifying includes at the encoder side, the coded picture data of a spliced bitstream, containing a library bitstream and a main bitstream, is processed by different operations in the hypothetical bitstream buffer to simulate the data fulfillment level of the bitstream buffer. This is used to check whether the hypothetical bitstream buffer is overflowed or underflowed and verify the qualification of the bitstream. A method of managing bitstream at the decoder side is exploited to decode the library picture, which is inserted in the spliced bitstream, at a proper time. This ensures that a bitstream buffer with a limited capacity neither overflows nor underflows and the decoder can decode and present the picture of the main bitstream at a (Continued)

proper temporal order, which avoids lag of the main bitstream picture and waste of the decoded picture buffer.

10 Claims, 4 Drawing Sheets

(51) Int. Cl.
*H04N 19/174* (2014.01)
*H04N 19/44* (2014.01)

(56) References Cited

U.S. PATENT DOCUMENTS

| | | | |
|---|---|---|---|
| 2015/0103921 A1* | 4/2015 | Hannuksela | H04N 19/152 375/240.26 |
| 2018/0014010 A1* | 1/2018 | Dai | H04N 19/59 |

FOREIGN PATENT DOCUMENTS

| | | |
|---|---|---|
| CN | 103460696 A | 12/2013 |
| CN | 105075269 A | 11/2015 |
| CN | 108668132 A | 10/2018 |
| WO | WO-2018/217907 A1 | 11/2018 |

\* cited by examiner

METHODS AND APPARATUS OF BITSTREAM VERIFYING AND DECODING

FIELD OF THE INVENTION

This invention relates to the field of image or video compression, and more typically. More specifically, the present invention relates to methods and apparatus of bitstream verifying and decoding.

BACKGROUND

1. Conventional Video Coding Methods

Figure 1:
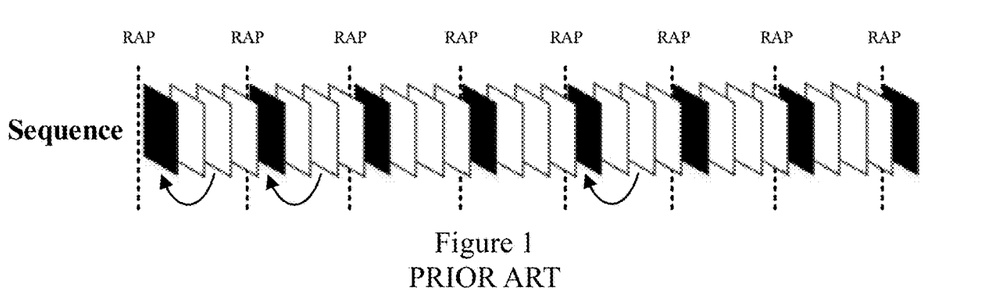
FIG. 1 Example of the dependency relation of the video sequence when coded with the conventional method 1, wherein the sequence is fragmented into multiple RASs.

In conventional video coding, video sequence is divided into multiple Random Access Segment (RAS) which supports random access functionality from the segment. As shown in the FIG. 1, a video sequence contains one or multiple RASs, each of which covers one presentation duration and contains one Random Access Point (RAP) picture and several non-RAP pictures. Every picture has its own presentation time that indicates the time when the picture should be present or displayed. Picture in a RAS can be intra coded or inter coded by referencing to other pictures in the same RAS, where the reference picture can be present pictures or non-present synthesized picture, and so on. However, in the conventional methods, a picture, whose presentation time follows that of the RAP picture, is restricted to only reference to the other pictures belonging to the same RAS as the current picture does. As for the pictures ahead of or after the RAS corresponding to the current picture, they cannot be referenced to by the current picture, as shown in the FIG. 1. Typically, there are several methods to describe the dependency relation between the current picture and its reference picture candidates:

In the conventional video coding schemes, such as H.264\AVC and H.265\HEVC, the dependency relation between current picture and its reference picture candidates are signaled by reference picture configuration set in the video coding layer, wherein the reference picture configuration set records the difference numbers between the number of current picture and those of its reference pictures. The reason of only recording the difference numbers in the reference picture configuration set is that, in the conventional video coding methods, the current picture and its reference picture candidates belong to the same RAS that can be decoded independently, and the numbers of the current picture and its reference picture candidates conform to the same numeration principle, e.g. numbered in temporal order. Thus, the difference number is enough to correctly identify the target reference picture candidate. If the current picture and its reference picture use different numeration principles, the same difference number would point to a different reference picture candidate from the one when they use the same numeration principles, because the conventional video coding methods do not provide means to signal the different numeration principles. When this happens, the encoder and decoder cannot find the correct reference picture candidate.

Figure 2:
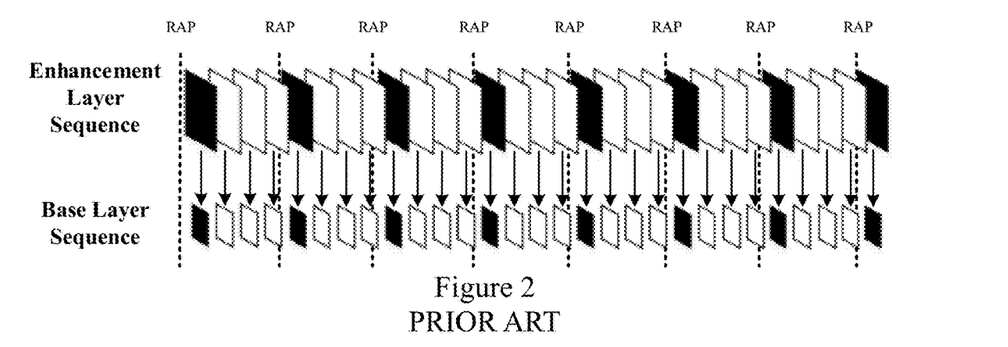
FIG. 2 Example of the dependency relation of the video sequence when coded with the conventional method 2, wherein the sequence is fragmented into multiple RASs.

In Scalable Video Coding (SVC) and Multiview Video Coding (MVC), as shown in FIG. 2, SVC/MVC introduce inter-layer/inter-view prediction, based on the inter prediction which only use reference picture candidate belonging to the same layer/view, to extend the range of the reference picture candidates. The extended reference picture candidates have the same number, e.g. the same timestamp, and belongs to different layers of an independently decodable segment. SVC/MVC indicate the dependency relation between different layers/views via layer flag together with the number that is same as the current coded picture.

Figure 3:
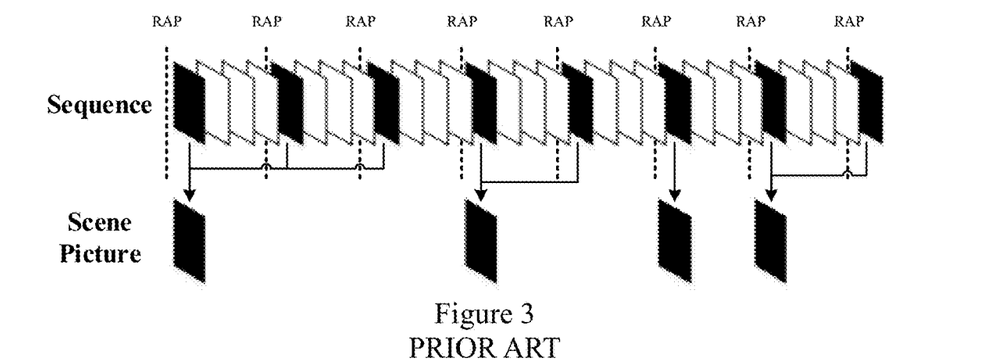
FIG. 3 Example of the dependency relation of the video sequence when coded with the conventional method 3, wherein the sequence is fragmented into multiple RASs.

In the scene picture based video coding in AVS2, as shown in FIG. 3, the dependency relation between coded picture and the scene picture is signaled by the flag of the type of the reference picture. Typically, AVS2 exploits flag to signal the special types of scene pictures, i.e. G picture and GB picture. The G/GB pictures are managed inside a special reference picture buffer, i.e. scene picture buffer. A flag is introduced to signal whether the current picture references to a G/GB picture. A special reference picture set construction method is designed, i.e. the G/GB picture is always put in the last position of the reference picture set. As a consequence, the above mechanism makes it possible for the current coded picture, which is numbered in numeration principle, to find the 1) GB picture, which is not numbered in numeration principle, or 2) G picture, which is beyond the restricted reference range of the current picture although is numbered in numeration principle, and use the G/GB picture as reference. However, the above method restricts that only one scene picture exists in the scene picture buffer at any time, and, meanwhile, the single scene picture must be inside the same RAS that containing the current picture.

2. Library-Based Video Coding

The mentioned mechanism of conventional methods would limit the number of reference pictures that can be used by the current coding picture, which could not efficiently improve the coding gain of picture encoding and decoding.

In order to make full use of the mutual information between multiple RASs in picture encoding, the encoder/decoder can select picture, from library, which has the similar texture content with the current encoding/decoding picture as reference picture when encoding/decoding the current picture. The special reference picture from library is referred to as library picture and the dataset storing the library picture as library. The method of allowing that one or multiple pictures in a video sequence uses one or multiple library pictures as reference picture for encoding/decoding is named as library-based video coding. Encoding a video sequence with the library-based video coding method generates a library layer bitstream containing the coded library picture and a video layer bitstream containing the coded video sequence picture. The mentioned two kinds of bitstreams is similar as the base layer bitstream and the enhancement layer bitstream in SVC (Scalable Video Coding), i.e. the video layer bitstream depends on the library layer bitstream. However, the management of the two bitstream generated by the library-based video coding method is different from the layered bitstream generated by SVC. The difference is that the layered bitstreams in SVC are synchronized based on a same timeline, while the two bitstreams in library-based video coding are not synchronized based on the same timeline but are synchronized based on explicitly signaling.

Figure 4:
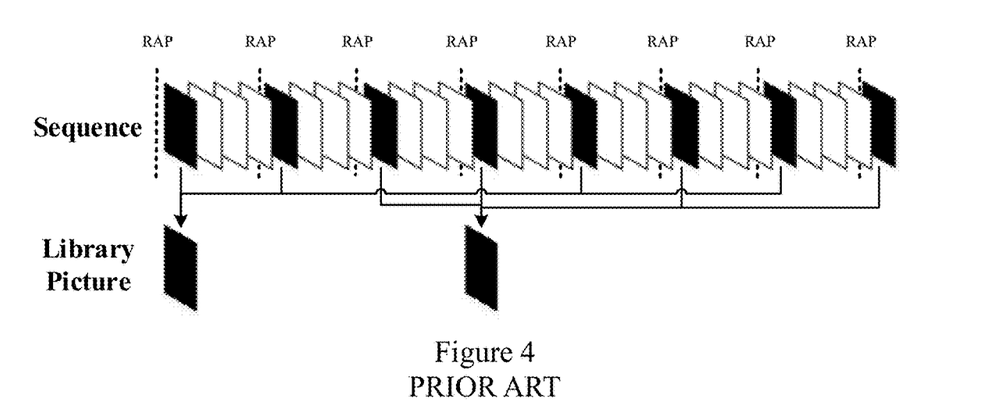
FIG. 4 Example of the dependency relation of the video sequence when coded with the conventional method 4, wherein the sequence is fragmented into multiple RASs.

In the library-based video coding, library picture is obtained and exploited as extra reference picture candidate for the picture encoding/decoding. FIG. 4 depicts the dependency relation between sequence picture and library picture while in using the library-based video coding method. Library picture makes it possible for the sequence picture to exploit the mutual information from a large-scale range of temporal domain, which improves the coding efficiency. However, the conventional library-based video coding method could no efficiently support the signaling of dependency relation between the sequence pictures and library pictures as well as the efficient management of library picture.

3. Conventional Bitstream Buffer Verification Methods

Figure 5:
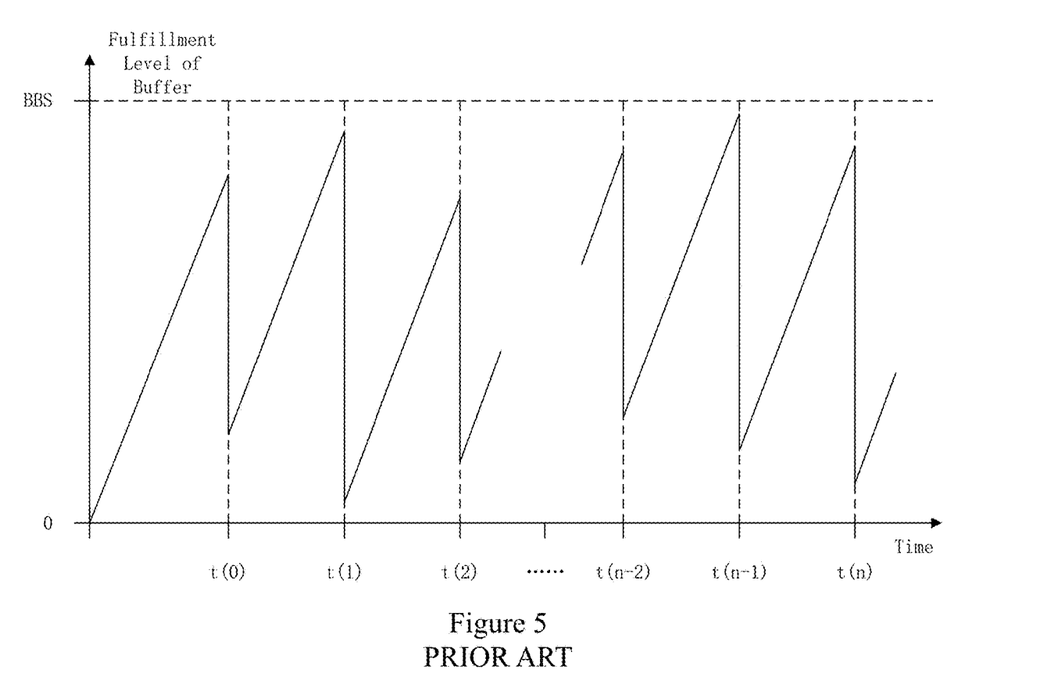
FIG. 5 Example of the change of the data level of a bitstream buffer using conventional method of bitstream buffer verification.

In the conventional technologies, bitstream verification methods verifies the bitstream in the hypothetical bitstream buffer. For example, in FIG. 5, the bitstream data gets into the hypothetical bitstream buffer sequentially and is moved out from the bitstream buffer for decoding at the decoding time instant t(n). A bitstream conforming to the verification should ensure that the data level of the hypothetical bitstream buffer is no larger than the capacity of the buffer, i.e. the buffer is not overflowed, and is no less than the necessary data size required for decoding at the current time instant, i.e. the buffer is not underflowed.

DETAILED DESCRIPTION OF THE PRESENT INVENTION

To overcome the mentioned problems of the conventional methods, this invention discloses methods and apparatus of bitstream verifying. At the encoder side, the coded picture data of a spliced bitstream, containing a library bitstream and a main bitstream, is processed by different operations in the hypothetical bitstream buffer to simulate the data fulfillment level of the bitstream buffer. This is used to check whether the hypothetical bitstream buffer is overflowed or underflowed and verify the qualification of the bitstream. The purpose of the verifying method is to check whether a bitstream produced by an encoder meets the constraint of the buffer.

The first aspect of the present invention provides a method of bitstream verifying, comprising:

1) For the coded data of a current picture in a bitstream obtained by splicing a main bitstream and a library bitstream, executing one of the following operations:

a. If the current picture belongs to the main bitstream, deciding whether to move the coded data of the current picture out from a hypothetical bitstream buffer or not, according to the difference value between the decoding time instant of the current picture and the presentation time instant of a previous picture that has been decoded before the current picture, wherein the previous picture belongs to the main bitstream.

b. If the current picture belongs to the library bitstream, moving the coded data of the current picture out from the hypothetical bitstream buffer, according to the decoding time instant of the current picture.

2) Checking the data fulfillment level of the hypothetical bitstream buffer, verifying whether the said bitstream meet the constraint of the buffer, according to whether the data fulfillment level exceeds the upper limit and lower limit of the capacity of the hypothetical bitstream buffer.

In another example of the present method, the operation of deciding whether to move the coded data of the current picture out from a hypothetical bitstream buffer or not, according to the difference value between the decoding time instant of the current picture and the presentation time instant of a previous picture that has been decoded before the current picture, is further executed as one of the following operations:

1) If the decoding time instant of the current picture is not earlier than the presentation time instant of a second previous picture that is the second nearest one decoded before the current picture, moving the coded data of the current picture out from the hypothetical bitstream buffer at the decoding time instant of the current picture.

2) If the decoding time instant of the current picture is earlier than the presentation time instant of a second previous picture that is the second nearest one decoded before the current picture, do not move coded data out from the hypothetical bitstream buffer at the decoding time instant of the current picture.

The second aspect of the present invention is to decode the library picture, which is inserted in the spliced bitstream, at a proper time by exploiting a mechanism of managing bitstream at the decoder side, wherein the mechanism corresponds to the present method of bitstream verifying. This ensures that a bitstream buffer with a limited capacity neither overflows nor underflows and the decoder can decode and present the picture of the main bitstream at a proper temporal order. The decoding method provided by the present invention can sequentially decode the library picture and the main bitstream picture by using a buffer with limited capacity, which avoids lag of the main bitstream picture and waste of the decoded picture buffer.

For the above purpose, the present invention provides a method of decoding which executes one of the following operations for the coded data of a current picture in a bitstream storing in a bitstream buffer, wherein the said bitstream is obtained by splicing a main bitstream and a library bitstream:

a. If the current picture belongs to the main bitstream, deciding whether to move the coded data of the current picture out from the bitstream buffer for decoding or not, according to the difference value between the decoding time instant of the current picture and the presentation time instant of a previous picture that has been decoded before the current picture, wherein the previous picture belongs to the main bitstream.

b. If the current picture belongs to the library bitstream, moving the coded data of the current picture out from the bitstream buffer for decoding, according to the decoding time instant of the current picture.

In another example of the present method, the operation of deciding whether to move the coded data of the current picture out from the bitstream buffer for decoding or not, according to the difference value between the decoding time instant of the current picture and the presentation time instant of a previous picture that has been decoded before the current picture, is further executed as one the of the following operations:

1) If the decoding time instant of the current picture is not earlier than the presentation time instant of a second previous picture that is the second nearest one decoded before the current picture, moving the coded data of the current picture out from the bitstream buffer for decoding at the decoding time instant of the current picture, and moving the decoded current picture into a to-be-present buffer.

2) If the decoding time instant of the current picture is earlier than the presentation time instant of a second previous picture that is the second nearest one decoded before the current picture, do not move coded data out from the bitstream buffer at the decoding time instant of the current picture.

In another example of the present method, the operation of moving the decoded current picture into a to-be-present buffer is executed as one of the following operations:

1) If the decoding time instant of the current picture is not earlier than the presentation time instant of a first previous picture that is the first nearest one decoded before the current picture, moving the said decoded current picture into a first to-be-present buffer.

2) If the decoding time instant of the current picture is not earlier than the presentation time instant of the second previous picture that is the second nearest one decoded before the current picture and is earlier than the presentation time instant of the first previous picture that is the first nearest one decoded before the current picture, moving a decoded picture from a second to-be-present buffer into the first to-be-present buffer and moving the said decoded current picture into the second to-be-present buffer.

In another example of the present method, the decoded version of the current picture is moved into a library picture buffer if the current picture belongs to the library bitstream.

The third aspect of the present invention provides an apparatus of bitstream verifying, comprising:

A processor,

A memory, and

One or more programs executing the following methods:

1) For the coded data of a current picture in a bitstream obtained by splicing a main bitstream and a library bitstream, wherein the said bitstream is stored in the memory, the processor executes one of the following operations:

a. If the current picture belongs to the main bitstream, the processor decides whether to move the coded data of the current picture out from a hypothetical bitstream buffer or not, according to the difference value between the decoding time instant of the current picture and the presentation time instant of a previous picture that has been decoded before the current picture, wherein the previous picture belongs to the main bitstream.

b. If the current picture belongs to the library bitstream, the processor moves the coded data of the current picture out from the hypothetical bitstream buffer, according to the decoding time instant of the current picture.

2) The processor checks the data fulfillment level of the hypothetical bitstream buffer, verifies whether the said bitstream is qualified, according to whether the data fulfillment level exceeds the upper limit and lower limit of the capacity of the hypothetical bitstream buffer.

In another example of the present apparatus, the processor deciding whether to move the coded data of the current picture out from a hypothetical bitstream buffer or not, according to the difference value between the decoding time instant of the current picture and the presentation time instant of a previous picture that has been decoded before the current picture, is executed as one of the following operations:

1) If the decoding time instant of the current picture is not earlier than the presentation time instant of a second previous picture that is the second nearest one decoded before the current picture, the processor moves the coded data of the current picture out from the hypothetical bitstream buffer at the decoding time instant of the current picture.

2) If the decoding time instant of the current picture is earlier than the presentation time instant of a second previous picture that is the second nearest one decoded before the current picture, the processor does not move coded data out from the hypothetical bitstream buffer at the decoding time instant of the current picture.

The fourth aspect of the present invention provides an apparatus of decoding, comprising:

A processor,

A memory, and

One or more programs executing the following methods:

The processor executes one of the following operations for the coded data of a current picture in a bitstream entering into a bitstream buffer in the memory, wherein the said bitstream is obtained by splicing a main bitstream and a library bitstream:

a. If the current picture belongs to the main bitstream, the processor decides whether to move the coded data of the current picture out from the bitstream buffer for decoding or not, according to the difference value between the decoding time instant of the current picture and the presentation time instant of a previous picture that has been decoded before the current picture, wherein the previous picture belongs to the main bitstream.

b. If the current picture belongs to the library bitstream, the processor moves the coded data of the current picture out from the bitstream buffer for decoding, according to the decoding time instant of the current picture.

In another example of the present apparatus, the processor deciding whether to move the coded data of the current picture out from the bitstream buffer for decoding or not, according to the difference value between the decoding time instant of the current picture and the presentation time instant of a previous picture that has been decoded before the current picture, is executed as one the of the following operations:

1) If the decoding time instant of the current picture is not earlier than the presentation time instant of a second previous picture that is the second nearest one decoded before the current picture, the processor moves the coded data of the current picture out from the bitstream buffer for decoding at the decoding time instant of the current picture, and moves the decoded current picture into a to-be-present buffer.

2) If the decoding time instant of the current picture is earlier than the presentation time instant of a second previous picture that is the second nearest one decoded before the current picture, the processor does not move coded data out from the bitstream buffer at the decoding time instant of the current picture.

BRIEF DESCRIPTION OF THE DRAWINGS

In order to clearly explain the embodiments or the conventional methods, drawings of the embodiments or the conventional methods are briefly introduced. Obviously, the following drawings are only for some embodiments of this invention. For those experts in this field, other drawings can be obtained according to the present drawings without any creative work.

DETAILED EMBODIMENTS

To make the purpose, technical methods and advantages of this invention more clear, the followings demonstrate detailed embodiments of this invention with the assistance of the drawings.

Definition of Terms

Necessary terms are defined before the explanation of detailed embodiments:

Library picture: is a picture that does not belong to the set of the pictures, which need to be present, in the current random access segment (RAS) containing the current picture as well as the former one RAS that is nearest to the current RAS. It is a kind of reference picture and can provide reference for current encoding/decoding picture.

RL (Reference to Library) picture: is a picture that is encoded or decoded by only referencing to a library picture. In one example, the RL picture follows closely after the sequence header and provides random access functionality by first decoding the external library picture and then decoding the RL picture itself. In another example, the RL picture follows closely after the sequence header and the library picture, and provides random access functionality by first decoding the library picture and then decoding the RL picture itself. In another example, the RL picture follows the sequence header, wherein the supplemental enhancement information, or extension data, or user data, etc. are between the sequence header and the RL picture, and provides random access functionality by first decoding the library picture and then decoding the RL picture itself.

Library stream: is also referred to as library bitstream, which only contains the library picture.

Main stream: is also referred to as main bitstream, which contains the picture that can reference to the library picture and does not contain the library picture. In one example, the library bitstream and main bitstream is spliced together to obtain a spliced bitstream.

Bitstream buffer: is used at the decoder side to store the input bitstream data. In one example, the capacity of the bitstream buffer is determined by the profile and level of the input bitstream.

Hypothetical bitstream buffer: is a virtual buffer, at the encoder side, that is used to simulate the state of the bitstream buffer, at the decoder side, which stores the input bitstream data. The hypothetical bitstream buffer does not actually store bitstream data. In one example, the hypothetical bitstream buffer records the change of data and estimates the data fulfillment level of the bitstream buffer at the decoder side by simulating the moving in and moving out operations of the bitstream data.

To-be-present buffer: is used to store a decoded picture and present and output the picture at a time instant that is different from the time instant when the picture is decoded.

Exemplary Embodiment 1

In a method of bitstream buffer verifier (BBV), given a spliced bitstream, in which the main bitstream pictures have a frame rate of N (N>0) pictures per T (T>0) seconds, i.e. the presentation time interval of the main bitstream pictures is T/N seconds, there is an encoder, which has a hypothetical decoder that can decode at least N+1 pictures in T seconds, processing the following operations. Note that the following decoding operations are not actually processed but simulated by the encoder to suppose that the picture data is moved out from the hypothetical bitstream buffer. The hypothetical bitstream buffer also does not actually process the operations of storing and moving out picture data but only records the change of picture data and the size of data in the hypothetical bitstream buffer. The operations are as follows:

1. The k-th (k>=0) decoding instant is referred to as t(k), wherein t(k)=k*T/(N+1), and the m-th (m>=0) presentation instant is referred to as t'(m), wherein t(m)=m*T/N.

2. The number of skipping decoding process is referred to as S (S>=0), which is set to zero, i.e. S=0. The number of library pictures having been decoded is referred to as B (B>=0), which is set to zero, i.e. B=0.

3. Importing the data of the sequence header, the extension and user data following the sequence header and the video editing code in the said spliced bitstream into the hypothetical bitstream buffer at the bitrate of R bit/s, wherein R>0. In one example, R is a constant. In one example, R is different bitrates in different periods of time.

4. Importing the data of the said spliced bitstream starting from the picture header of the 0-th picture into the hypothetical bitstream buffer at the bitrate of R bit/s, and executing the following verifying operations:

1) Moving the coded data of the 0-th picture out from the hypothetical bitstream buffer at the time instant t(0), wherein the said 0-th picture is a library picture that is not present, and setting B=B+1.

2) Moving the coded data of the 1-st picture out from the hypothetical bitstream buffer at the time instant t(1), wherein the said 1-st picture is an RL picture. The 1-st picture is temporarily stored in a first hypothetical to-be-present buffer and present at the time instant t'(0) (Note that the said first hypothetical to-be-present buffer does not actually storing the picture data but only is used to indicate the presentation property of the said picture, which means that the said picture is the picture to be present and output at the next presentation time instant, wherein the said operations of presenting and outputting do not actually present or output the said picture data but are only used to indicate that the said picture has been processed and is no longer marked as stored in the said first hypothetical to-be-present buffer. In one example, the said first hypothetical to-be-present buffer only contains one picture).

3) Performing loop operations for the k-th (k>1) picture,

A. If the said picture is a picture in the main bitstream, judging the range of the difference value between the decoding time instant and the presentation time instant of the said picture, i.e. judging the different value D between t(k+S) and t'(k−B). In one example, judging the sequential order of the decoding instant of the said picture and the presentation time instant of the picture decoded before the said picture.

i. If D<T/N, moving the coded data of the k-th picture out from the hypothetical bitstream buffer at the time instant t(k+S), wherein the said k-th picture is stored in the first hypothetical to-be-present buffer and is present at the time instant t' (k−B).

ii. If T/N<=D<2*T/N, at the time instant t(k+S), a. If D=T/N, presenting and outputting the picture stored in the said first hypothetical to-be-present buffer, and, b. If T/N<D<2*T/N, which means that the picture stored in the said first hypothetical to-be-present buffer has been present and output, moving the picture in a second hypothetical to-be-present buffer to the first hypothetical to-be-present buffer, moving the data of the k-th picture out from the hypothetical bitstream buffer and moving the said k-th picture into the second hypothetical to-be-present buffer, wherein the k-th picture is present at the time instant t'(k−B). Note that the property of the said second hypothetical to-be-present buffer is similar as the said first hypothetical to-be-present buffer.

iii. If D>2*T/N, at the time instant t(k+S), accumulating the number of skipping decoding, i.e. S=S+1, wherein no data is moved out from the hypothetical bitstream buffer and decoded, and setting k=k−1, which means that the said picture will be verified at the next time instant.

B. If the said picture is library picture, moving the coded data of the k-th picture out from the hypothetical bitstream buffer for decoding at the time instant t(k+S), wherein the said k-th picture is stored in the library picture buffer and is not present, and setting B=B+1. Note that the property of the said library picture buffer is similar as the said first hypothetical to-be-present buffer.

4) Setting k=k+1 and going back to the operation 3) until all data of the bitstream is verified.

Exemplary Embodiment 2

In a method of bitstream buffer verifier, the mechanism of bitstream operation corresponding to the method is adopted at the decoder to timely decode the library pictures interspersed in the spliced bitstream, but at the same time, it is ensured that the bitstream buffer with limited capacity neither overflows nor overflows. And the decoder can decode and present the picture in the main bitstream according to the proper temporal order. Given that the frame rate of the main bitstream picture in a given bitstream is N pictures per T seconds, that is, the presentation time interval of pictures is T/N seconds, then for a decoder that can decode at least N+1 frames of pictures in T seconds, the decoder performs the following operations:

1. The k-th (k>=0) decoding instant is referred to as t(k), wherein t(k)=k*T/(N+1), and the m-th (m>=0) presentation instant is referred to as t'(m), wherein t(m)=m*T/N.

2. The number of skipping decoding process is referred to as S (S>=0), which is set to zero, i.e. S=0. The number of library pictures having been decoded is referred to as B (B>=0), which is set to zero, i.e. B=0.

3. Selecting a random access point in the bitstream as the starting point.

4. Importing the data of the sequence header after the random access point, the extension and user data following the sequence header and the video editing code in the said spliced bitstream into the bitstream buffer at the bitrate of R bit/s, wherein R>0; In one example, R is a constant. In one example, R is different bitrates in different periods of time.

5. Importing the data of the said spliced bitstream starting from the picture header of the 0-th picture into the bitstream buffer at the bitrate of R bit/s, and processing the following verifying operations:

1) Moving the coded data of the 0-th picture out from the bitstream buffer for decoding at the time instant t(0), wherein the said 0-th picture is a library picture that is not present, and setting B=B+1.

2) Moving the coded data of the 1-st picture out from the bitstream buffer for decoding at the time instant t(1), wherein the said 1-st picture is an RL picture. The 1-st picture is temporarily stored in a first to-be-present buffer and present at the time instant t'(0)

3) Performing loop operations for the k-th (k>1) picture,

A. If the said picture is not a library picture, judging the range of the difference value between the decoding time instant and the presentation time instant of the said picture, i.e. judging the different value D between t(k+S) and t'(k−B). In one example, judging the sequential order of the decoding instant of the said picture and the presentation time instant of the picture decoded before the said picture.

i. If D<T/N, moving the coded data of the k-th picture out of the bitstream buffer at the time instant t(k+S) for decoding, wherein the said k-th picture is stored in the first to-be-present buffer and is present at the time instant t'(k−B).

ii. If T/N<=D<2*T/N, at the time instant t(k+S), a. If D=T/N, presenting and outputting the picture stored in the said first to-be-present buffer, and, b. If T/N<D<2*T/N, which means that the picture stored in the said first to-be-present buffer has been present and output, moving the picture from a second to-be-present buffer to the first to-be-present buffer, moving the coded data of the k-th picture out of the bitstream buffer for decoding, wherein the said k-th picture is temporarily stored in the second to-be-present buffer and is present at the time instant t'(k−B).

iii. If D>2*T/N, at the time instant t(k+S), accumulating the number of skipping decoding, i.e. S=S+1, wherein no data is moved out from the bitstream buffer and decoded, and setting k=k−1, which means that the said picture will be verified or decoded at the next time instant.

B. If the said picture is a library picture, moving the coded data of the k-th picture out from the bitstream buffer for decoding at the time instant t(k+S), wherein the said k-th picture is stored in the library picture buffer and is not present, and setting B=B+1.

4) Setting k=k+1 and going back to the operation until all data of the bitstream is verified.

Exemplary Embodiment 3

Figure 6:
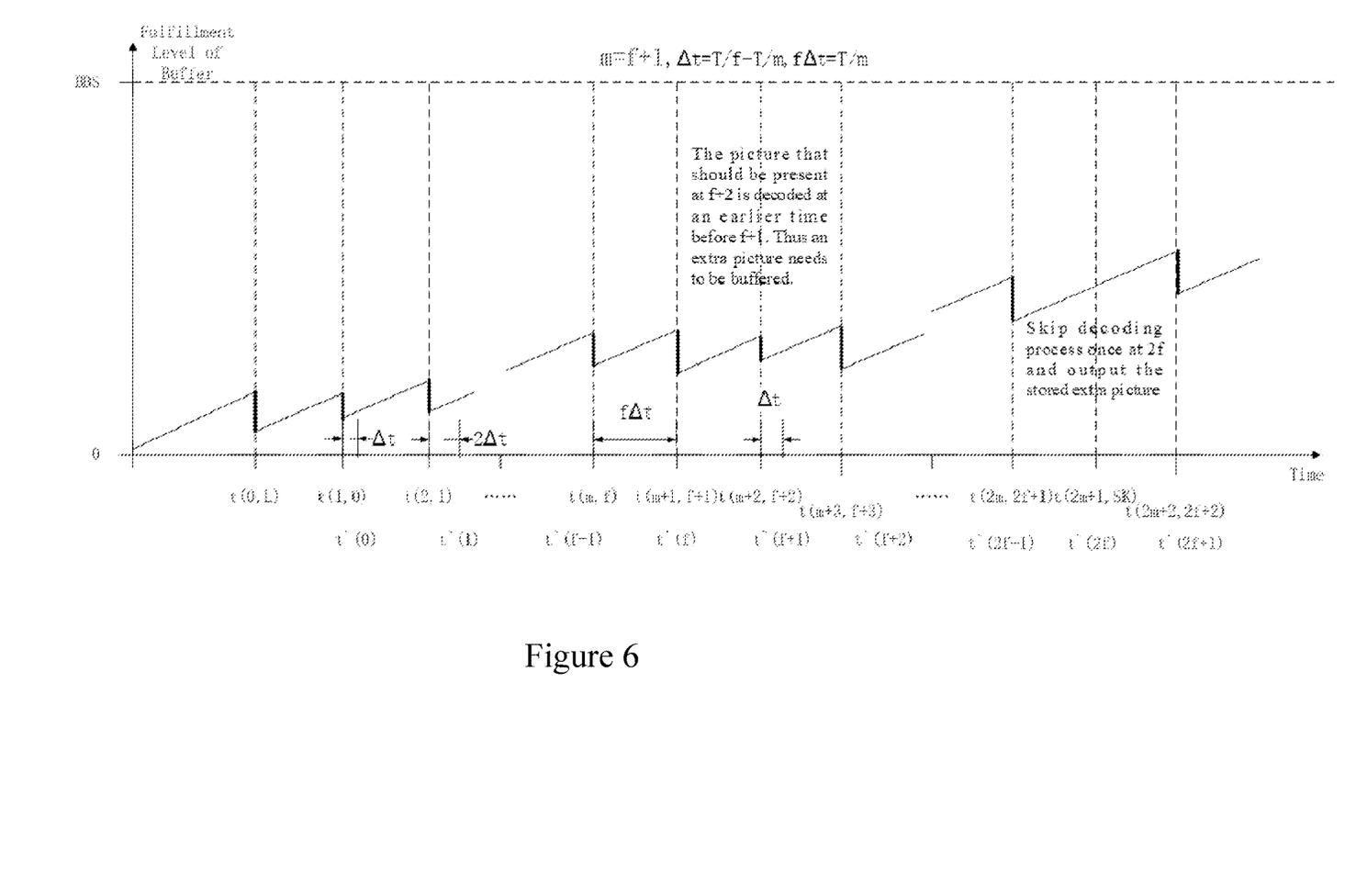
FIG. 6 Example of the change of the data level of a bitstream buffer using a present method of bitstream buffer verification provided by the exemplary embodiment of the present invention.

For the said method in Embodiment 2, an exemplary specific verification operation and the result of the data change in the bitstream buffer are shown in FIG. 6. In this exemplary operation, let the frame rate of the spliced bitstream be N=f (f>0), T=1 second, that is, the presentation time interval of pictures is T/N seconds, and the decoding capability of the decoder is T seconds to decode at least m=f+1 pictures. The decoder performs the following operations:

1. The k-th (k>=0) decoding instant is referred to as t(k), wherein t(k)=k*T/(N+1), and the k-th presentation instant is referred to as t'(k), wherein t'(k)=k*T/N. And t(k,p) refers that the decoded picture at the time instant t(k) will be present at the time instant t'(p). When the value of p is 'L', it means that the picture is a library picture which is not present. When the value of p is 'SK', it means that the decoding moment is skipped and no picture decoding is performed.

2. The number of skipping decoding process is referred to as S (S>=0), which is set to zero, i.e. S=0. The number of library pictures having been decoded is referred to as B (B>=0), which is set to zero, i.e. B=0.

3. Selecting a random access point in the bitstream as the starting point.

4. Importing the data of the sequence header after the random access point, the extension and user data following the sequence header and the video editing code in the said spliced bitstream into the bitstream buffer at the bitrate of R bit/s, wherein R>0.

5. Importing the data of the said spliced bitstream starting from the picture header of the 0-th picture into the bitstream buffer at the bitrate of R bit/s, and processing the following verifying operations:

1) Moving the coded data of the 0-th picture out from the bitstream buffer at the time instant $t(0,L)$, wherein the said 0-th picture is a library picture that is not present, and setting $B=B+1$, i.e. $B=1$ after the addition process.

2) Moving the coded data of the 1-st picture out from the bitstream buffer at the time instant $t(1,0)$, wherein the said 1-st picture is an RL picture. The 1-st picture is temporarily stored in a first to-be-present buffer and present at the time instant $t'(0)$.

3) Performing loop operations for the k-th $(k>1)$ picture, a. For the 2-nd picture, the picture is not a library picture, and $D=t(k+S)-t'(k-B)=t(2)-t'(1)<T/N$. Therefore, move the coded data of the 2-nd picture out from the bitstream buffer for decoding at the time instant $t(2,1)$, wherein the said 2-nd picture is temporarily stored in the first to-be-present buffer and present at the time instant $t'(1)$;

b. (Omit the operation of some non-library pictures in the middle)

c. For the m-th picture, the picture is not a library picture, and $D=t(k+S)-t'(k-B)=t(m)-t'(m-1)=t(m)-t'(f)<T/N$. Therefore, move the coded data of the m-th picture out from the bitstream buffer for decoding at the time instant $t(m,f)$, wherein the said m-th picture is temporarily stored in the first to-be-present buffer and present at the time instant $t'(f)$;

d. For the (m+1)-th picture, the picture is not a library picture, and $D=t(k+S)-t'(k-B)=t(m+1)-t'(m)=t(m+1)-t'(f+1)=T/N$. Therefore, at the time instant $t(m+1,f+1)$, since $D=T/N$, the picture stored in the first to-be-present buffer is present output at the time instant $t'(f)$. And because the second to-be-present buffer is empty buffer with no buffer pictures at this time and moving the coded data of the (m+1)-th picture out from the bitstream buffer for decoding, wherein the said (m+1)-th picture is temporarily stored in the second to-be-present buffer and present at the time instant $t'(f+1)$;

e. For the (m+2)-th picture, the picture is not a library picture, and $D=t(k+S)-t'(k-B)=t(m+2)-t'(m+1)=t(m+2)-t'(f+2)>T/N$. Therefore, at the time instant $t(m+2,f+2)$, moving the picture in the second to-be-present buffer into the first to-be-present buffer and moving the coded data of the (m+2)-th picture out from the bitstream buffer for decoding, wherein the said (m+2)-th picture is temporarily stored in the second to-be-present buffer and present at the time instant $t'(f+2)$;

f. For the (m+3)-th picture, the picture is not a library picture, and $D=t(k+S)-t'(k-B)=t(m+3)-t'(m+2)=t(m+3)-t'(f+3)>T/N$. Therefore, at the time instant $t(m+3,f+3)$, moving the picture in the second to-be-present buffer into the first to-be-present buffer and moving the coded data of the (m+3)-th picture out from the bitstream buffer for decoding, wherein the said (m+3)-th picture is temporarily stored in the second to-be-present buffer and present at the time instant $t'(f+3)$;

g. (Omit the operation of some non-library pictures in the middle);

h. For the 2m-th picture, the picture is not a library picture, and $D=t(k+S)-t'(k-B)=t(2m)-t'(2m-1)=t(2m)-t'(2f+1)>T/N$. Therefore, at the time instant $t(2m,2f+1)$, moving the picture in the second to-be-present buffer into the first to-be-present buffer and moving the coded data of the 2m-th picture out from the bitstream buffer for decoding, wherein the said 2m-th picture is temporarily stored in the second to-be-present buffer and present at the time instant $t'(2f+1)$;

i. For the 2m+1-th picture, the picture is not a library picture, and $D=t(k+S)-t'(k-B)=t(2m+1)-t'(2m)=t(2m+1)-t'(2f+2)=2*T/N$. Therefore, at the time instant $t(2m+1,SK)$, the data is not moved from the bitstream buffer, no decoding is performed and the number of skipping decoding is accumulated, that is, $S=S+1$, at this moment $S=1$ after the addition process; And set $k=k-1$, that is, waiting for the next moment to verify or decode the picture.

j. Operating the 2m+1-th picture again, the picture is not a library picture, and $D=t(k+S)-t'(k-B)=t(2m+2)-t'(2m)=t(2m+2)-t'(2f+2)>T/N$. Therefore, at the time instant $t(2m+1,SK)$, moving the picture from the second to-be-present buffer into the first to-be-present buffer and moving the coded data of the (2m+1)-th picture out from the bitstream buffer for decoding, wherein the said (2m+1)-th picture is temporarily stored in the second to-be-present buffer and present at the time instant $t'(2f+2)$;

k. Repeating the loop operation until all data of the bitstream is verified.

Exemplary Embodiment 4

Figure 7:
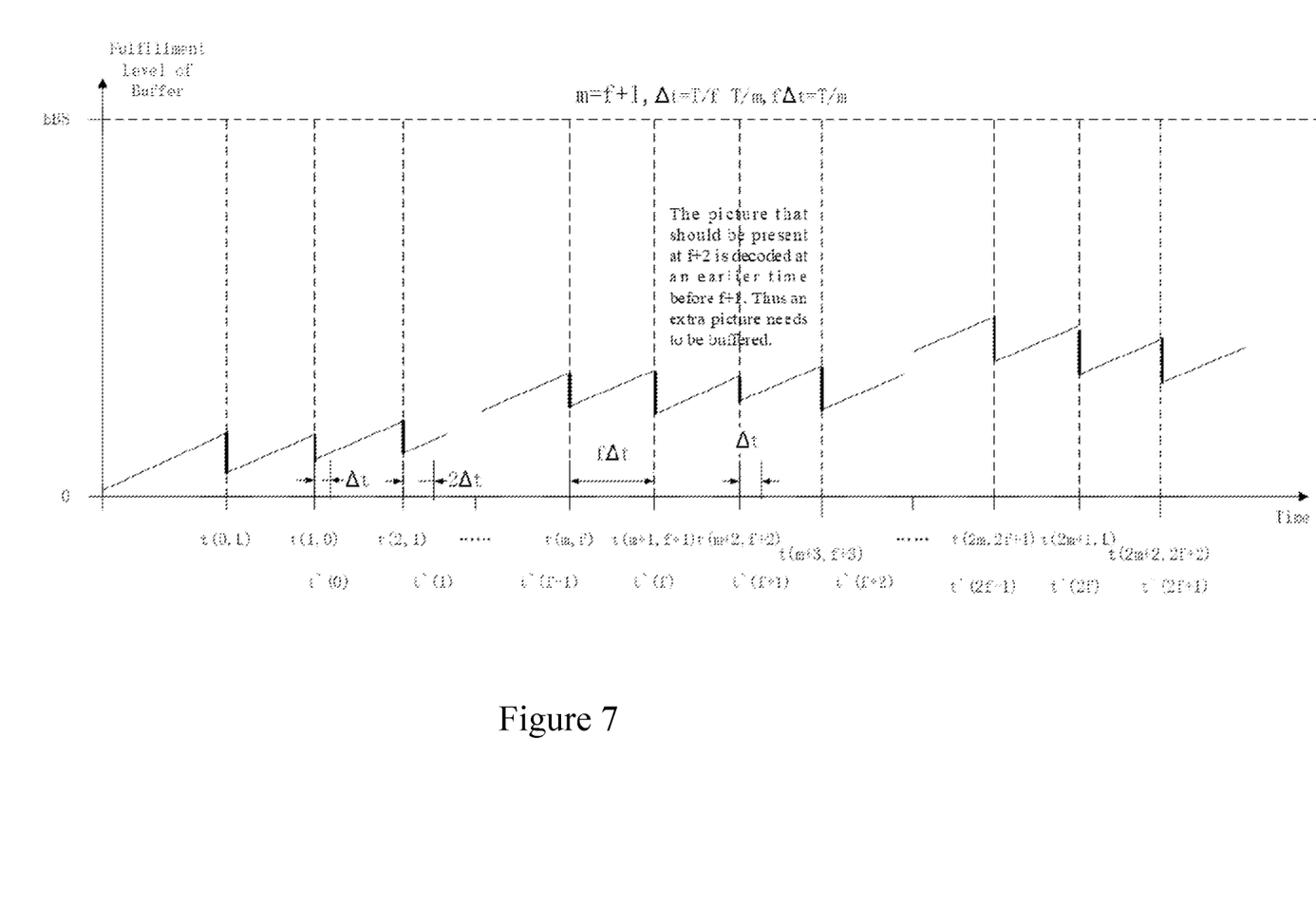
FIG. 7 Example of the change of the data level of a bitstream buffer using another present method of bitstream buffer verification provided by another exemplary embodiment of the present invention.

A specific verification operation and the result of the data change in the bitstream buffer are shown in FIG. 7. In this exemplary operation, difference from the above exemplary embodiment 3 is as follows:

For the (2m+1)-th picture, the picture is a library picture. Therefore, at the time instant $t(2m+1,L)$, moving the coded data of the (2m+1)-th picture out from the bitstream buffer for decoding, wherein the said (2m+1)-th picture is temporarily stored in the library buffer and not present; set $B=B+1$.

Exemplary Embodiment 5

The difference between this embodiment and all the above-mentioned embodiment 1 to 4 is that the decoder analyzes and obtains the index of main bitstream picture from the information of the picture header in the spliced bitstream, such as POC (picture order count), DOI (decoding order index), POI (presentation order index). And the sequence of the decoded picture is calculated according to the index of the main bitstream picture. Therefore, the library picture interspersed in the bitstream will affect neither the index of the main bitstream picture nor the present time instant $t'(n)$ of the main bitstream picture calculated by the decoder. In this implementation method, there is no need to perform the operation of accumulating the amount B of library pictures that have been decoded before the current picture. That is, the decoder does not need to perform "recording the amount of decoded library pictures as B, and $B=0$", nor does it need to perform the operation of "set $B=B+1$" when processing library pictures.

Exemplary Embodiment 6

The difference between this embodiment and all the above-mentioned embodiment 1 to 5 is that, in one method of implementation, the picture in the spliced bitstream uses a low-delay reference structure, where $t'(n)$ represents the presentation time instant of the main bitstream picture. And in another method of implementation, the picture in the spliced bitstream uses a non-low-delay reference structure, such as layered coding structure, the actual presentation time of pictures in the spliced bitstream is equal to the presentation time t'(n) plus the delayed-presentation time. At this time, the decoded picture buffer of the decoder will store these delayed-presentation pictures to ensure the present of pictures in the correct order.

Exemplary Embodiment 7

Based on the above embodiment 1 to 6, this embodiment makes the adjustment to the size of the picture data in the spliced bitstream. In one method of implementation, when the operation of skipping picture decoding occurs at a certain decoding moment, increasing the rate at which the bitstream buffer data is moved out by increasing the data size of the subsequent pictures (for example, assigning the picture with a higher quality or bitrate) to the data that enters into the bitstream buffer, so as to avoid the overflow of the bitstream buffer. In another method of implementation, when the operation of decoding the library picture occurs at a certain decoding moment, decreasing the rate at which the bitstream buffer data is moved out by decreasing the data size of the subsequent pictures (for example, assigning the picture with a lower quality or bitrate) to the data that enters into the bitstream buffer, so as to avoid the underflow of the bitstream buffer.

Exemplary Embodiment 8

In one method of implementation, the difference between this embodiment and all the above-mentioned embodiment 1 to 7 is that decoder can decode at least N+C frames of pictures within T (T>0) seconds, wherein the variable N (N>0) is the number of pictures in the main bitstream that needs to be present and output in T seconds, and C (C>0) is the number of library pictures that need extra decoding in T seconds, e.g. C=1 or C=2 and so on. In this method of implementation, the decoder uses t(k) to represent the k-th decoding time instant, wherein t(k)=k*T/(N+C); t'((m) refers to the m-th present time instant, wherein t(m)=m*T/N.

Exemplary Embodiment 9

The present exemplary embodiment realizes the method of bitstream verifying based on the AVS3 standard.

In one example, the bitstream stored in the bitstream buffer is a single bitstream or spliced bitstream. Typically, given a main bitstream with the value of LibraryPictureEnableFlag equal to 0, the said bitstream stored in the bitstream buffer is a single bitstream comprising the main bitstream. Given a main bitstream with the value of LibraryPictureEnableFlag equal to 1, the said bitstream stored in the bitstream buffer is a spliced bitstream obtained by splicing the main bitstream and the library bitstream that is referenced to by the main bitstream, wherein the library bitstream is interspersed in the main bitstream. Note that the said main bitstream does not contain library picture, and the said LibraryPictureEnableFlag indicates whether the main bitstream references to the library bitstream, wherein a value of 1 indicates that the main bitstream references to the library bitstream, i.e. the main bitstream is the main stream defined in the present invention, and a value of 0 indicates that the main bitstream does not reference to library bitstream.

In one example, for a spliced bitstream in non-low-delay condition, the method of moving data out from the bitstream buffer is that:

If the n-th picture is a library picture, the decoding time t(n) of the picture is equal to the decoding time t(n−1) of the previous picture plus one check time interval delta(n), and t'(n)=t'(n−1).

If the n-th picture is not a library picture, the reference decoding time of the picture is t'(n)=t' (n−1)+delta'(n).
If t(n−1)+delta(n) is less than the reference decoding time t'(n) (In one example, the said reference decoding time is the presentation time mentioned in the above exemplary embodiments 1~8), then the decoding time t(n) of the picture is equal to the decoding time t(n−1) of the previous picture plus twice the check time interval delta(n);
Otherwise, the decoding time t(n) of the picture is equal to the decoding time t(n−1) of the previous picture plus one check time interval delta(n).

Note that t'(0)=t(0), and the value of the said check time interval is determined by the picture data in the bitstream. In one example, the value of the said check time interval is equal to the reciprocal of frame rate. In one example, the value of the said check time interval is equal to the product of the reciprocal of frame rate multiplied by n, wherein n is non-zero and, for example, is equal to 2, 1.5, 0.5, etc.

In one example, for a spliced bitstream in low-delay condition, the method of moving data out from the bitstream buffer is that:

If the n-th picture is a library picture, the decoding time t(n) of the picture is equal to the decoding time t(n−1) of the previous picture plus one check time interval delta(n), and plus the product of BbvCheckTimes multiplied by the picture period, and t'(n)=t'(n−1).

If the n-th picture is not a library picture, the reference decoding time of the picture is t'(n)=t' (n−1)+delta'(n):
If t(n−1)+delta(n) is less than the reference decoding time t'(n), then the decoding time t(n) of the picture is equal to the decoding time t(n−1) of the previous picture plus twice the check time interval delta(n), and plus the product of BbvCheckTimes multiplied by the picture period;
Otherwise, the decoding time t(n) of the picture is equal to the decoding time t(n−1) of the previous picture plus one check time interval delta(n), and plus the product of BbvCheckTimes(n) multiplied by the picture period.

Note that t'(0)=t(0), and the value of the said check time interval is determined by the picture data in the bitstream. In one example, the value of the said check time interval is equal to the reciprocal of frame rate. In one example, the value of the said check time interval is equal to the product of the reciprocal of frame rate multiplied by n, wherein n is non-zero and, for example, is equal to 2, 1.5, 0.5, etc. The BbvCheckTimes is calculated according to the data of the bitstream, indicating the checking times of the bitstream buffer In one example, for a spliced bitstream, the check time interval delta(n) is defined as follows:

Let the reciprocal of the sum of frame rate and 1 is T, and the reciprocal of frame rate be T'.

The check time interval delta(n) of the BBV buffer is equal to T, and delta'(n) is determined by the non-library picture output after the previous one picture is decoded.

If the value of progressive_sequence is '1' and the value of field_coded_sequence is '0':
If the value of repeat_first_field of the output picture is '0', delta'(n) is equal to T.
If the value of repeat_first_field of the output picture is '1' and the value of top_field_first is '0', delta'(n) is equal to 2T.
If the value of repeat_first_field of the output picture is '1' and the value of top_field_first is '1', delta'(n) is equal to 3T.

If the value of progressive_sequence is '0' and the value of field_coded_sequence is '0':
  If the value of repeat_first_field of the output picture is '0', delta'(n) is equal to T.
  If the value of repeat_first_field of the output picture is '1', delta'(n) is equal to 1.5T.
If the value of progressive_sequence is '0' and the value of field_coded_sequence is '1', delta'(n) is equal to 0.5T.

Note that, the said progressive_sequence, field_coded_sequence, repeat_first_field, top_field_first are syntax elements in a bitstream indicating the property of the bitstream. The value of the syntax is obtained by parsing the bitstream. The progressive_sequence indicates whether the picture in the bitstream uses progressive scanning. The field_coded_sequence indicates whether the picture in the bitstream uses field scanning, i.e. a picture is constructed by field frames. The repeat_first_field indicates whether the bitstream repeats the first field frame. The top_field_first indicates whether the first field frame in the bitstream is a top field frame.

Exemplary Embodiment 10

The present exemplary embodiment realizes the method of bitstream verifying based on the AVS3 standard. Compared with the exemplary embodiment 9, the present exemplary embodiment exploits different reasons for determination.

In one example, the bitstream stored in the bitstream buffer does not contain library bitstream or does contain library bitstream. Typically, given a main bitstream with the value of LibraryPictureEnableFlag equal to 0, the said bitstream stored in the bitstream buffer contains the main bitstream and does not contain the library bitstream. Given a main bitstream with the value of LibraryPictureEnableFlag equal to 1, the said bitstream stored in the bitstream buffer is obtained by splicing the main bitstream and the library bitstream that is referenced to by the main bitstream, wherein the library bitstream is interspersed in the main bitstream in one example, or the library bitstream is ahead of the main bitstream in another example. Note that the said main bitstream does not contain library picture, and the said LibraryPictureEnableFlag indicates whether the main bitstream references to the library bitstream, wherein a value of 1 indicates that the main bitstream references to the library bitstream, i.e. the main bitstream is the main stream defined in the present invention, and a value of 0 indicates that the main bitstream does not reference to library bitstream.

The time instant when the coded data of the n-th picture is moved out from the BBV buffer is the decoding time instant of the n-th picture. The decoding time instant t(0) of the 1-st picture of the video sequence is equal to the time instant, when the picture start code of the 1-st picture enters into the BBV buffer, plus tt(0). tt(0) is the time interval between the time instant when the picture start code of the 1-st picture enters into the BBV buffer and the decoding time of the 1-st picture. The determination of the decoding time instant t(n) of the n-th picture and the method used to move the coded data out from the BBV buffer have the following examples, and other examples can use similar ways together with different descriptions or judgement conditions.

In one example, for a spliced bitstream in non-low-delay condition, the method of moving data out from the bitstream buffer is that:

For a decoded bitstream that does not contain a library stream, the decoding time t(n) of the n-th picture is equal to the decoding time t(n−1) of the previous picture plus one check time interval delta(n).

For a decoded bitstream containing a library stream, if the n-th picture is a library picture, the reference decoding time of the picture t'(n)=t'(n−1), where t'(0)=t(0); the decoding time t(n) of the picture is equal to the decoding time t(n−1) of the previous picture plus one check time interval delta(n).

For a decoded bitstream containing a library stream, if the n-th picture is not a library picture, the reference decoding time of the picture is t'(n)=t'(n−1)+delta'(n), where t'(0)=t(0); the decoding time t(n) of the picture is as follows:
  If t(n−1)+delta(n) is less than the reference decoding time t'(n)−delta'(n)−delta'(n−1), then t(n) is equal to the decoding time t(n−1) of the previous picture plus twice the check time interval delta(n);
  Otherwise, t(n) is equal to the decoding time t(n−1) of the previous picture plus one check time interval delta(n).

The check time interval delta(n) and the hypothetical check time interval delta'(n) are defined in the following paragraphs.

At the decoding time t(n) of each picture, the fullness of BBV buffer shall be less than BBS. The fullness B(n) of BBV buffer shall be equal to or greater than f(n), wherein f(n) is the size of the bitstream data of the n-th picture; otherwise, BBV buffer is underflow, code bitstreams conforming to the present exemplary embodiment should not underflow.

At the decoding time t(n) of each picture, remove the coded data of the picture from BBV buffer and decode it instantaneously.

In one example, for a spliced bitstream in low-delay condition, the method of moving data out from the bitstream buffer is that:

For a decoded bitstream that does not contain a library stream, the decoding time t(n) of the n-th picture is equal to the decoding time t(n−1) of the previous picture plus one check time interval delta(n), and plus the product of BbvCheckTimes multiplied by the picture period.

For a decoded bitstream containing a library stream, if the n-th picture is a library picture, the reference decoding time of the picture is t'(n)=t'(n−1), wherein t'(0)=t(0); the decoding time t(n) of the picture is equal to the decoding time t(n−1) of the previous picture plus one check time interval delta(n), and plus the product of BbvCheckTimes multiplied by the picture period, wherein the BbvCheckTimes is calculated according to the data of the bitstream, indicating the checking times of the bitstream buffer.

For a decoded bitstream containing a library stream, if the n-th picture is not a library picture, the reference decoding time of the picture is t'(n)=t'(n−1)+delta'(n), wherein t'(0)=t(0); the decoding time t(n) of the picture is as follows:
  If t(n−1)+delta(n) is less than the reference decoding time t'(n)−delta'(n)−delta'(n−1), then t(n) is equal to the decoding time t(n−1) of the previous picture plus twice the check time interval delta(n), and plus the product of BbvCheckTimes multiplied by the picture period;
  Otherwise, t(n) is equal to the decoding time t(n−1) of the previous picture plus one check time interval delta(n), and plus the product of BbvCheckTimes(n) multiplied by the picture period.

The check time interval delta(n) and the hypothetical check time interval delta'(n) are defined in the following paragraphs. If the value of field_coded_sequence is '1', then picture period is equal to 0.5 times the reciprocal of frame rate; if the value of field_coded_sequence is '0', then picture period is equal to the reciprocal of frame rate.

At the decoding time t(n) of each picture, the fullness of BBV buffer shall be less than BBS. All coded data of the picture shall be in BBV buffer, and then the picture shall be removed instantaneously.

If BbvCheckTimes is greater than 0, current decoded picture is defined as a "big picture". The last picture of a video sequence shall not be a "big picture".

The check time interval delta(n) and the hypothetical check time interval delta'(n) is defined as follows:

Let the reciprocal of frame rate be T, the reciprocal of the sum of frame rate and 1 is D; In another example, D is the reciprocal of the sum of the frame rate and k, wherein k is the difference value between the frame rate and the number of pictures that can be decoded by a decoder in 1 second. number of extra pictures decoded by the decoder. If the decoded bitstream does not contain a library stream, then P is equal to T; if the decoded bitstream contains a library stream and a sequence stream, then P is equal to D.

The check time interval delta(n) and the assumed check time interval delta'(n) of BBV buffer are determined by the non-library picture output after the (n−1)-th picture is decoded.

If the value of progressive_sequence is '1' and the value of field_coded_sequence is '0':
  If the value of repeat_first_field of the output picture is '0', then delta(n) is equal to P and delta'(n) is equal to T.
  If the value of repeat_first_field of the output picture is '1' and the value of top_field_first is '0', then delta(n) is equal to 2P and delta'(n) is equal to 2T.
  If the value of repeat_first_field of the output picture is '1' and the value of top_field_first is '1', then delta(n) is equal to 3P and delta'(n) is equal to 3T.

If the value of progressive_sequence is '0' and the value of field_coded_sequence is '0':
  If the value of repeat_first_field of the output picture is '0', then delta(n) is equal to P and delta'(n) is equal to T.
  If the value of repeat_first_field of the output picture is '1', then delta(n) is equal to 1.5P and delta'(n) is equal to 1.5T.

If the value of progressive_sequence is '0' and the value of field_coded_sequence is '1', then delta(n) is equal to 0.5P and delta'(n) is equal to 0.5T.

Note that, the said progressive_sequence, field_coded_sequence, repeat_first_field, top_field_first are syntax elements in a bitstream indicating the property of the bitstream. The value of the syntax is obtained by parsing the bitstream. The progressive_sequence indicates whether the picture in the bitstream uses progressive scanning. The field_coded_sequence indicates whether the picture in the bitstream uses field scanning, i.e. a picture is constructed by field frames. The repeat_first_field indicates whether the bitstream repeats the first field frame. The top_field_first indicates whether the first field frame in the bitstream is a top field frame.

The invention claimed is:

1. A method of bitstream verification, comprising:
  1) for the coded data of a current picture in a bitstream obtained by splicing a main bitstream and a library bitstream, executing one of the following operations:
    a. if the current picture belongs to the main bitstream, deciding whether to move the coded data of the current picture out from a hypothetical bitstream buffer or not, according to whether the decoding time instant of the current picture is earlier than the presentation time instant of a second previous picture that is the second nearest one decoded before the current picture, wherein the previous picture belongs to the main bitstream; and
    b. if the current picture belongs to the library bitstream, moving the coded data of the current picture out from the hypothetical bitstream buffer for decoding, according to the decoding time instant of the current picture; and
  2) checking the data fulfillment level of the hypothetical bitstream buffer, verifying whether the said bitstream is qualified, according to whether the data fulfillment level exceeds the upper limit and lower limit of the capacity of the hypothetical bitstream buffer.

2. The method according to claim 1, wherein the operation of deciding whether to move the coded data of the current picture out from a hypothetical bitstream buffer or not, according to whether the decoding time instant of the current picture is earlier than the presentation time instant of a second previous picture that is the second nearest one decoded before the current picture, is executed as one of the following operations:
  1) if the decoding time instant of the current picture is not earlier than the presentation time instant of a second previous picture that is the second nearest one decoded before the current picture, moving the coded data of the current picture out from the hypothetical bitstream buffer at the decoding time instant of the current picture,
  2) if the decoding time instant of the current picture is earlier than the presentation time instant of a second previous picture that is the second nearest one decoded before the current picture, do not move coded data out from the hypothetical bitstream buffer at the decoding time instant of the current picture,
  wherein both operations do not change the presentation time instant of the current picture.

3. A method of decoding, executing one of the following operations for the coded data of a current picture in a bitstream storing in a bitstream buffer, wherein the said bitstream is obtained by splicing a main bitstream and a library bitstream:
  a. if the current picture belongs to the main bitstream, deciding whether to move the coded data of the current picture out from the bitstream buffer for decoding or not, according to whether the decoding time instant of the current picture is earlier than the presentation time instant of a second previous picture that is the second nearest one decoded before the current picture, wherein the previous picture belongs to the main bitstream,
  b. if the current picture belongs to the library bitstream, moving the coded data of the current picture out from the bitstream buffer for decoding, according to the decoding time instant of the current picture.

4. The method according to claim 3, wherein the operation of deciding whether to move the coded data of the current picture out from the bitstream buffer for decoding or not, according to whether the decoding time instant of the current picture is earlier than the presentation time instant of a second previous picture that is the second nearest one decoded before the current picture, is executed as one the of the following operations:
  1) if the decoding time instant of the current picture is not earlier than the presentation time instant of a second previous picture that is the second nearest one decoded before the current picture, moving the coded data of the current picture out from the bitstream buffer for decoding at the decoding time instant of the current picture, and moving the decoded current picture into a to-be-present buffer, wherein the to-be-present buffer is used to store the decoded current picture and present and output the said picture at a time instant that is different from the decoding time instant, 2) if the decoding time instant of the current picture is earlier than the presentation time instant of a second previous picture that is the second nearest one decoded before the current picture, do not move coded data out from the bitstream buffer at the decoding time instant of the current picture, wherein both operations do not change the presentation time instant of the current picture.

5. The method according to claim 4, wherein the operation of moving the decoded current picture into a to-be-present buffer is executed as one of the following operations:

1) if the decoding time instant of the current picture is not earlier than the presentation time instant of a first previous picture that is the first nearest one decoded before the current picture, moving the said decoded current picture into a first to-be-present buffer, 2) if the decoding time instant of the current picture is not earlier than the presentation time instant of the second previous picture that is the second nearest one decoded before the current picture and is earlier than the presentation time instant of the first previous picture that is the first nearest one decoded before the current picture, moving a decoded picture from a second to-be-present buffer into the first to-be-present buffer and moving the said decoded current picture into the second to-be-present buffer.

6. The method according to claim 3, wherein the decoded version of the current picture is moved into a library picture buffer and not for present if the current picture belongs to the library bitstream.

7. An apparatus of bitstream verification, comprising:
a processor,
a memory, and
one or more programs executing the following methods:

1) for the coded data of a current picture in a bitstream obtained by splicing a main bitstream and a library bitstream, wherein the said bitstream is stored in the memory, the processor executes one of the following operations:

a. if the current picture belongs to the main bitstream, the processor decides whether to move the coded data of the current picture out from a hypothetical bitstream buffer or not, according whether the decoding time instant of the current picture is earlier than the presentation time instant of a second previous picture that is the second nearest one decoded before the current picture, wherein the previous picture belongs to the main bitstream, b. if the current picture belongs to the library bitstream, the processor moves the coded data of the current picture out from the hypothetical bitstream buffer for decoding, according to the decoding time instant of the current picture, 2) the processor checks the data fulfillment level of the hypothetical bitstream buffer, verifies whether the said bitstream is qualified, according to whether the data fulfillment level exceeds the upper limit and lower limit of the capacity of the hypothetical bitstream buffer.

8. The apparatus according to claim 7, wherein the processor deciding whether to move the coded data of the current picture out from a hypothetical bitstream buffer or not, according to whether the decoding time instant of the current picture is earlier than the presentation time instant of a second previous picture that is the second nearest one decoded before the current picture, is executed as one of the following operations:

1) if the decoding time instant of the current picture is not earlier than the presentation time instant of a second previous picture that is the second nearest one decoded before the current picture, the processor moves the coded data of the current picture out from the hypothetical bitstream buffer at the decoding time instant of the current picture, 2) if the decoding time instant of the current picture is earlier than the presentation time instant of a second previous picture that is the second nearest one decoded before the current picture, the processor does not move coded data out from the hypothetical bitstream buffer at the decoding time instant of the current picture, wherein both operations do not change the presentation time instant of the current picture.

9. An apparatus of decoding, comprising:
a processor,
a memory, and
one or more programs executing the following methods:
the processor executes one of the following operations for the coded data of a current picture in a bitstream entering into a bitstream buffer in the memory, wherein the said bitstream is obtained by splicing a main bitstream and a library bitstream:

a. if the current picture belongs to the main bitstream, the processor decides whether to move the coded data of the current picture out from the bitstream buffer for decoding or not, according to whether the decoding time instant of the current picture is earlier than the presentation time instant of a second previous picture that is the second nearest one decoded before the current picture, wherein the previous picture belongs to the main bitstream, b. if the current picture belongs to the library bitstream, the processor moves the coded data of the current picture out from the bitstream buffer for decoding, according to the decoding time instant of the current picture.

10. The apparatus according to claim 9, wherein the processor deciding whether to move the coded data of the current picture out from the bitstream buffer for decoding or not, according to whether the decoding time instant of the current picture is earlier than the presentation time instant of a second previous picture that is the second nearest one decoded before the current picture, is executed as one the of the following operations:

1) if the decoding time instant of the current picture is not earlier than the presentation time instant of a second previous picture that is the second nearest one decoded before the current picture, the processor moves the coded data of the current picture out from the bitstream buffer for decoding at the decoding time instant of the current picture, and moves the decoded current picture into a to-be-present buffer, 2) if the decoding time instant of the current picture is earlier than the presentation time instant of a second previous picture that is the second nearest one decoded before the current picture, the processor does not move coded data out from the bitstream buffer at the decoding time instant of the current picture,
wherein both operations do not change the presentation time instant of the current picture.

* * * * *